Aug. 25, 1953

C. A. ZINN ET AL
ROTARY TURRET FOR MULTIPLE SPINDLE
POLISHING AND BUFFING MACHINES 2,649,668

Filed Sept. 6, 1949

INVENTORS.
Clarence A. Zinn
Henry G. Perkins

By Otis A. Earl
Attorney.

Aug. 25, 1953     C. A. ZINN ET AL     2,649,668
ROTARY TURRET FOR MULTIPLE SPINDLE
POLISHING AND BUFFING MACHINES

Filed Sept. 6, 1949     4 Sheets-Sheet 2

INVENTORS.
Clarence A. Zinn
Henry G. Perkins
BY
Attorney

Aug. 25, 1953

C. A. ZINN ET AL 2,649,668

ROTARY TURRET FOR MULTIPLE SPINDLE
POLISHING AND BUFFING MACHINES

Filed Sept. 6, 1949

INVENTORS.
Clarence A. Zinn
Henry G. Perkins
By
Attorney

INVENTORS.
Clarence A. Zinn
Henry G. Perkins
By
Attorney.

Patented Aug. 25, 1953

2,649,668

UNITED STATES PATENT OFFICE 2,649,668

ROTARY TURRET FOR MULTIPLE SPINDLE POLISHING AND BUFFING MACHINES

Clarence A. Zinn and Henry G. Perkins, Kalamazoo, Mich., assignors to Hammond Machinery Builders, Inc., Kalamazoo, Mich., a corporation of Michigan Application September 6, 1949, Serial No. 114,238

12 Claims. (Cl. 51—237)

1

This invention relates to improvements in rotary turret for multiple spindle polishing and buffing machines.

The principal objects of this invention are:

First, to provide a rotary turret including a plurality of work supporting spindles for successively advancing working pieces past a plurality of working positions in which the speed of rotation of the individual spindles can be controlled independently of the frequency and the velocity of indexing movement of the spindles between the working positions.

Second, to provide table rotating or indexing mechanism for the spindle carrying table of a turret machine which mechanism is operative independently of the mechanism for rotating the spindles.

Third, to provide a turret type machine having a rotatable table carrying a plurality of spindles rotatable about their individual axes with means for rotating the table and indexing the spindles, the speed of the indexing movement of the table being constant and the frequency of the indexing movement being controllable.

Fourth, to provide a turret type machine for advancing work pieces past a plurality of working positions which machine is capable of increased production due to the fact that the spindles can be individually rotated at optimum speeds depending upon the type of work to be performed on the work piece while the frequency of indexing of the spindles between working positions is independently adjusted to assure advancing of the spindles and work pieces as soon as the operation at one position is completed.

Fifth, to provide a multiple spindle turret type machine with pneumatically controlled mechanism for periodically indexing the turret and actuating other mechanisms associated with the machine.

Other objects and advantages relating to details of our machine will be apparent from a consideration of the following description and claims.

The drawings of which there are four sheets illustrate a preferred form of the machine.

Our machine consists generally of a hollow cylindrical base 1 having a forwardly extending projection 2 on its front side. The base is of relatively heavy construction to rigidly support the working elements of the machine and the front of the projection 2 is provided with a closure door 3 offering access to the interior of the base. Rotatably supported on top of the base is a circular turret table 4 having five vertically extending rotatable spindles 5 equally spaced therearound. The machine is designed for use in connection with other polishing, grinding or buffing machines not shown and is operative as will be described in detail to successively advance each of the spindles 5 to four working positions each adjacent to one of the grinding or polishing machines and to rotate the spindle on its axis so that a work piece secured to the spindle by a suitable fixture or chuck will be operated on by the grinding or polishing machine. One of the positions of the spindles 5, preferably that adjacent to the forward projection 2, constitutes a starting or operator's position at which finished work is removed from the spindle and the new work piece installed. Mechanism holding the spindle stationary at the operator's position is provided as will be more particularly described later.

Figure 2:
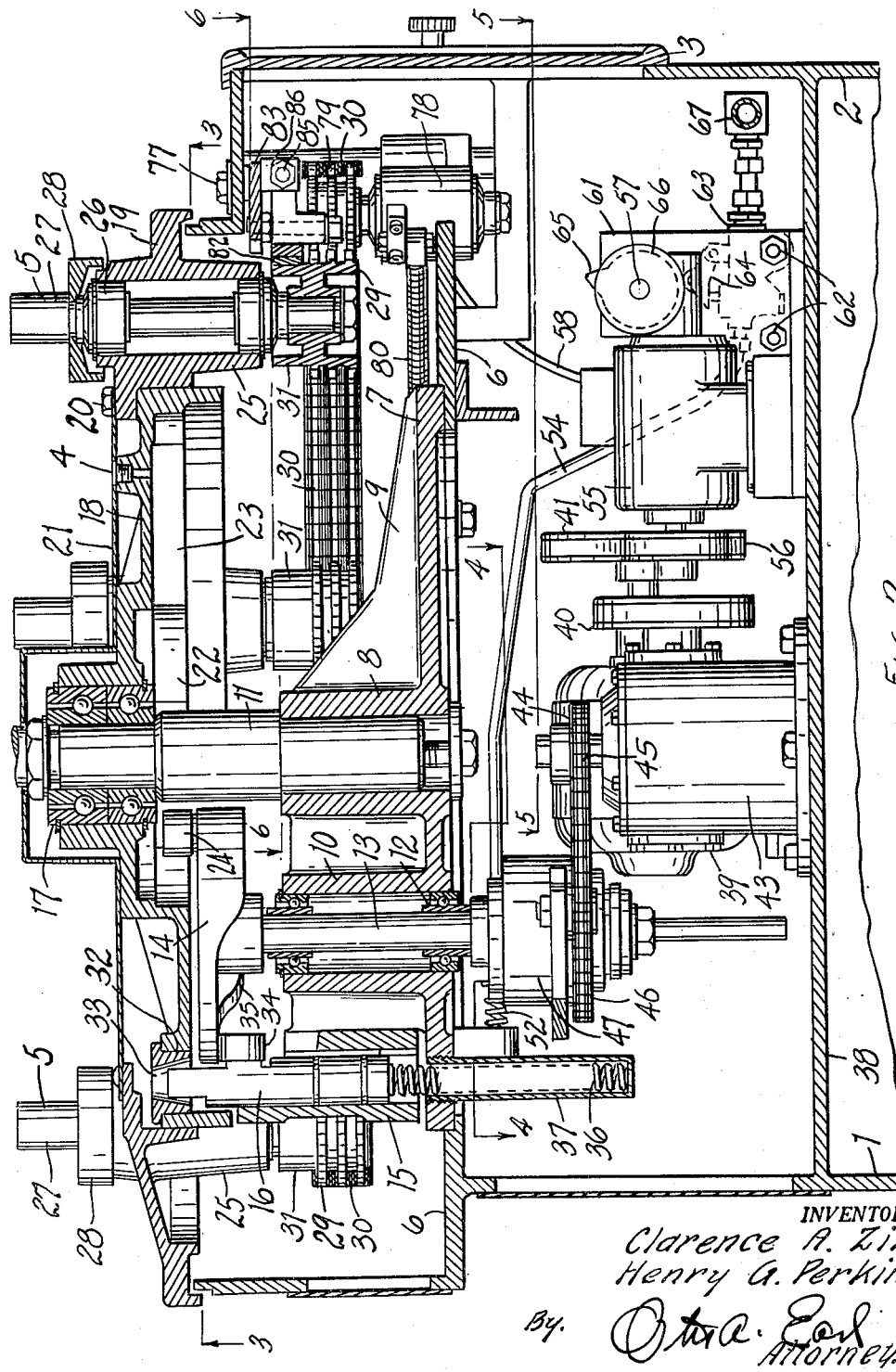
Fig. 2 is a fragmentary longitudinal vertical cross sectional view through the machine taken along the plane of the line 2—2 in Figs. 1 and 3.
Figure 6:
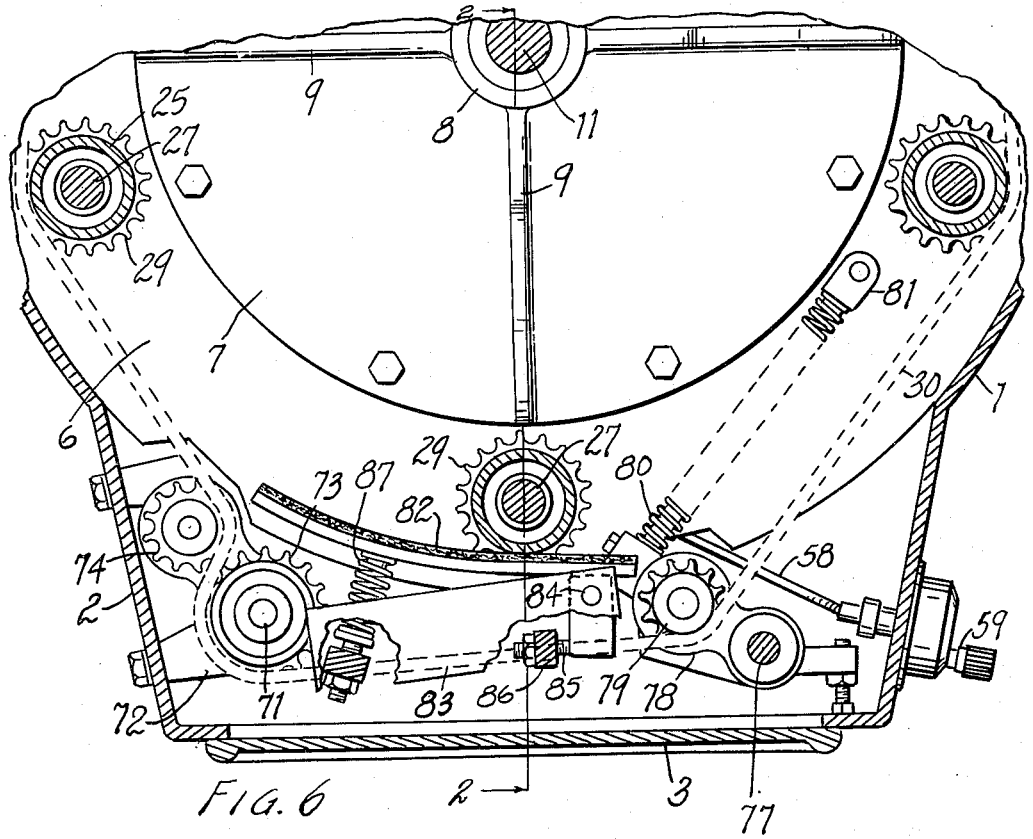
Fig. 6 is a fragmentary horizontal cross sectional view taken along the plane of the line 6—6 in Fig. 2 and illustrating the driving connections for rotating the several spindles about their axes.
Figure 7:
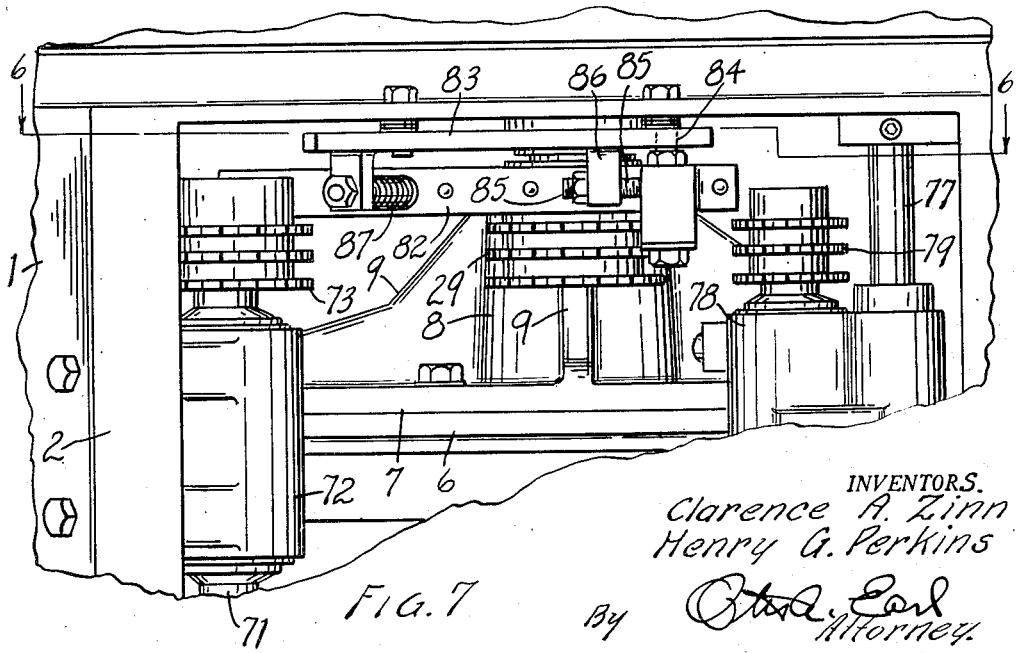
Fig. 7 is a fragmentary front elevational view of the machine with the front cover plate removed and illustrating the spindle driving mechanism shown in Fig. 6 with the chain removed.

With particular attention to Figs. 2 and 6, it will be noted that the base 1 is provided with an internal flat annular flange 6 extending completely around the base near its upper end and serving to support a generally circular bearing plate 7. The bearing plate is provided with a central upstanding boss 8 reinforced by the ribs 9 and an offset boss 10 positioned to the rear of the boss 8. The central boss 8 has secured therein a vertically extending shaft or axle 11 and the boss 10 is provided with bearings 12 for rotatably supporting the shaft 13 of a Geneva wheel 14. A third boss 15 to the rear of the boss 10 forms a bore for slidably receiving the lock pin 16.

The upper end of the central axle 11 is provided with bearings 17 rotatably supporting the circular table 18. The periphery of the table 18 supports the turret ring 19 secured in place by the screws 20 and a sheet metal cover plate 21 is secured to the ring and extends over the table and bearings 17 to protect them from the dust of the grinding and polishing operations.

Figure 3:
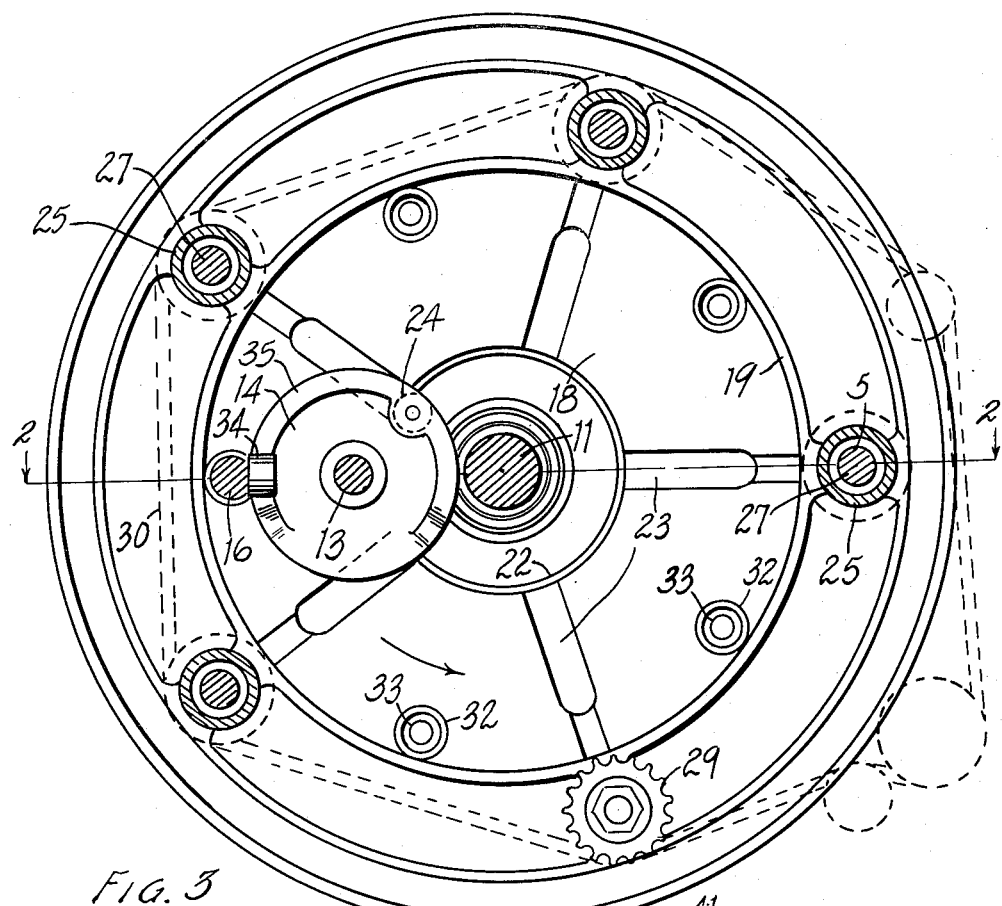
Fig. 3 is a horizontal cross sectional view taken along the plane of the line 3—3 in Fig. 2 and showing the under side of the turret table.

The under side of the table 18 is formed to provide a central cylindrical recess 22 from which extend five radial slots 23 as is most clearly shown in Figs. 2 and 3. The Geneva wheel 14 mounted on the shaft 13 is positioned beneath the table 18 and provided with a roller 24 projecting upwardly into the recess 22 where it is operative to move into successive radial slots 23 and rotate the table through 72° on each rotation of the Geneva wheel as will be readily understood.

The annular turret ring 19 is provided with five bearing bosses 25 positioned at equally spaced intervals therearound and located opposite the ends of the radial slots 23 in the table. Each of the bosses 25 receives bearings 26 for rotatably supporting the spindle shafts 27. The upper ends of the spindle shafts are provided with hoods 28 shielding the upper bearings and the lower ends of the spindle shafts carry sprockets 29 engageable with the sprocket chain 30. Each of the sprockets 29 has an upwardly extending smooth drum portion 31 for engagement with a brake as will be further described presently.

Intermediate of the radial slots 23 the table 18 is formed with holes 32 receiving a taper bored plug or collar 33 into which the locking pin 16 is arranged to project. The upper end of the lock pin 16 carries a roller 34 which underlies the periphery of the Geneva wheel 14 and the wheel itself is provided with a depending cam 35 arranged to depress the roller 34 and pin 16 prior to engagement of the roller 24 in one of the radial slots in the table so that the table is free to rotate on the axle 11 to advance the table and spindles. After disengagement of the Geneva roller 24 the cam 35 permits the lock pin 16 to rise into locking engagement with the succeeding plug 33. A spring 36 supported in a tubular housing 37 below the plate 7 is effective to return the pin 16.

Figure 5:
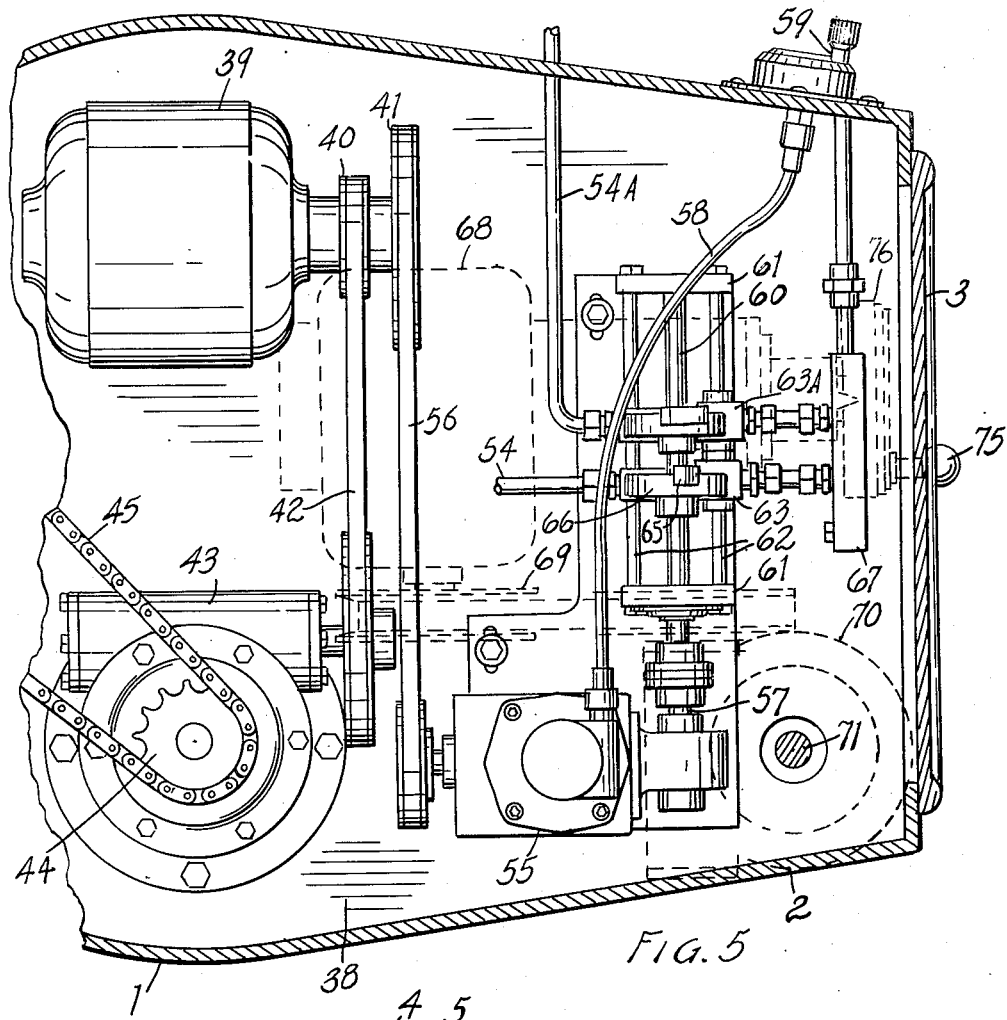
Fig. 5 is a fragmentary horizontal cross sectional view taken along the plane of the line 5—5 in Fig. 2 and illustrating the mechanism for controlling the frequency of the indexing movement of the table.
Figure 1:
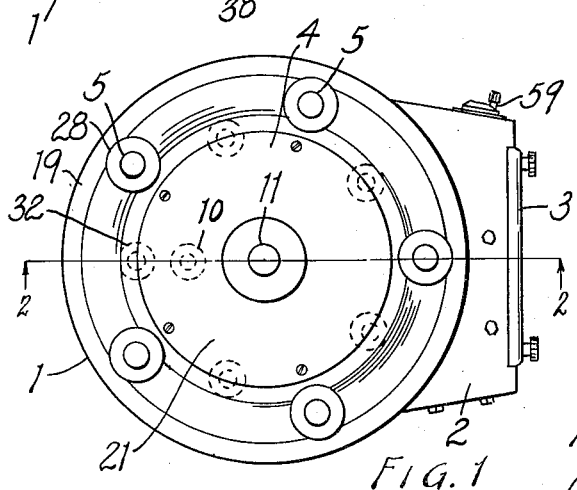
Fig. 1 is a plan view of the machine.
Figure 4:
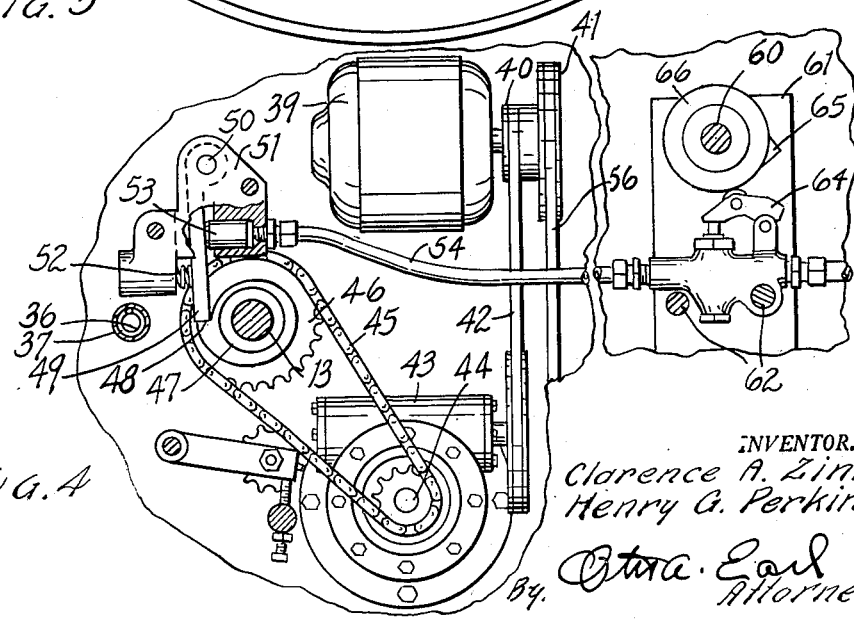
Fig. 4 is a fragmentary horizontal cross sectional view taken along the plane of the line 4—4 in Fig. 2 and illustrating the driving connections for indexing the table.

The mechanism for rotating the Geneva wheel 14 and its shaft 13 is most particularly illustrated in Figs. 2, 4 and 5. A partition or shelf 38 formed within the base 1 below the plate 7 serves to support an electric motor 39 having a pair of pulleys 40 and 41 mounted on its shaft. The pulley 40 continually drives a belt 42 for driving speed reducing mechanism housed in a gear box 43. The speed reducing mechanism rotates the vertical shaft and sprocket 44 which is connected by the chain 45 to a sprocket 46 rotatable on the lower end of the Geneva shaft 13. The sprocket 46 is periodically connectible to the shaft 13 by means of a one revolution clutch mechanism 47. The clutch 47 is provided with a disengaging or lockout cam 48 (see Fig. 4) engageable with the locking dog or pawl 49. The pawl 49 is pivotally connected at 50 to a supporting housing 51 on the underside of the plate 7 and is biased to stop engaging position by the spring 52. A piston 53 slidable in a cylinder in the housing 51 is operative to overcome the spring 52 and disengage the locking pawl whenever a supply of compressed air is admitted to the cylinder through the conduit 54 as will be described. Thus the sprocket 46 is continuously driven by the motor 39 but is effective to rotate the Geneva wheel and index the table 18 only when the one revolution clutch mechanism is actuated.

The mechanism for periodically and adjustably actuating the one revolution clutch consists of an infinitely variable speed reducing mechanism 55 which is driven by a belt 56 from the pulley 41. The speed reducing mechanism 55, which may be of any suitable type, functions to rotate the output shaft 57 at an infinitely variable speed ratio with respect to the pulley 41. Adjustment of the speed of the shaft 57 is controlled by means of the flexible cable 58 extending to a dial and crank 59 on the side of the projection 2 on the machine base. We prefer to calibrate the dial of the crank 59 in terms of the number of work pieces which will be completed in an hour's operation of the machine.

The output shaft 57 is coupled to a cam shaft 60 carried between the support plates 61 within the forward projection 2 of the base. A pair of rods or tie bolts 62 extend between the support plates 61 below the cam shaft and serve to support the air valves 63 and 63A below the cam shaft. The valve 63 is provided with a rocker arm and roller 64 for opening its plunger and the roller of the rocker arm is positioned to be engaged by the lift 65 of a cam 66. The valve 63 is supplied with compressed air from a manifold 67 in the front extension of the base and is arranged to deliver to the conduit 54.

It will thus be seen that each revolution of the cam shaft 60 will cause the valve 63 to be opened admitting a charge of air to the piston 53 and thus disengage the locking pawl 49 from the cam 48. The one revolution clutch is then effective to rotate the Geneva shaft and wheel one revolution and index the table and turret ring as previously described. The frequency with which this indexing operation will take place is easily controlled by means of the crank 59 to vary the speed of rotation of the take-off shaft 57 of speed reducer 55. Note that the rapidity with which the indexing motion is made is independent of the frequency of the indexing motion. We prefer to operate the speed reducer 43 and chain 45 as fast as possible having regard to the design and strength of the effected parts in order that as little time as possible will be lost in indexing the spindles from one working position to another. Valve 63A is similarly operated in timed relationship with the indexing movement of the turret. By proper shaping of its lift surface 65A a supply of compressed air may be admitted to the conduit 54A for actuating auxiliary machines such as the grinders cooperating with the turret spindles.

The mechanism for rotating the spindles about their axes consists of a second electric motor 68 mounted within the base 1 and below the shelf 38. The motor is illustrated in dotted lines in Fig. 5 and is provided with a spring pressed variable diameter pulley belt 69 connected to a speed reducer 70 also mounted below the shelf 38. The speed reducer 70 drives the vertically extending shaft 71 which projects upwardly through the shelf 38 to a bearing block 72 secured to the side of the front extension 2. Above the bearing block 72 the shaft 71 is provided with a sprocket 73 for driving the chain 30. An idler sprocket 74 also carried by the bearing block assures effective driving connection between the chain and the sprocket 73. The speed of the shaft 71 and sprocket 73 may be adjusted by turning the knob 75 and crank wheel 76 which function to move the motor 68 toward the speed reducer thus permitting the spring pressed pulley 69 to effect a change in the drive ratio between the motor and speed reducer. The details of the connection between the motor 68 and the shaft 71 are not shown in greater detail as any of several well known types of variable speed drives will function satisfactorily to drive the shaft 71.

Extending downwardly from the top wall of the forward extension 2 and to the right side thereof is a pivot pin 77 adjustably supporting a bearing block 78. The bearing block 78 swingably carries an idler shaft and sprocket 79 and the block and sprocket are urged to chain tightening position by the spring 80 operating against an abutment 81 secured to the annular shelf 6 on the body. It will be noted that the idler sprocket 79 and drive sprocket 73 are positioned forwardly of the forward or operator's position of the spindles 27 so that the chain 30 does not engage the sprocket of the spindle located at the operator's position.

As each spindle moves into the operator's position the drum portion 31 of its sprocket is brought into engagement with a brake shoe 82. The brake shoe 82 is carried by a bracket 83 bolted to the underside of the top wall of the front extension. A pivot pin 84 supports the brake shoe on the bracket and an adjusting screw 85 passed through a depending arm 86 on the bracket is effective to move the leading or entering end of the brake shoe toward or away from the drum portions of the sprockets on the spindles. A backing spring 87 having one end bearing against a second arm on the bracket 83 serves to yieldably press the trailing end of the brake shoe against the spindles. The foregoing brake structure is operative to frictionally engage the drum portion of each spindle as the spindle enters the operator's position and effectively stop rotation of the spindle. This facilitates removal of the finished work piece and mounting of a new work piece by the operator. As the spindle leaves the operator's position, the drum portion 31 is moved along the brake shoe 82 thus imparting a rotary motion to the spindle prior to engagement of the spindle sprocket 29 with the chain 30. Thus the shock of engagement between the spindle and the chain is reduced as the spindle is already rotating when its sprocket engages the chain and it is only necessary for the chain and sprocket to synchronize their speeds.

Having thus described our invention what we claim as new and desire to secure by Letters Patent is:

1. In a turret type machine having a revolvable table with a plurality of spindles mounted on said table for rotation about their individual axes the combination of driving mechanisms comprising, a first motor, a chain looped around the path of movement of said spindles and engaged therewith for rotating said spindles, adjustable speed reducing mechanism drivingly connecting the first motor with said chain, said chain being spaced from the path of said spindles at one revolved position thereof on said table to provide a non-rotating operator's position of the spindles, a yieldably mounted brake shoe positioned to engage the spindle located at said operator's position, a second motor, a Geneva wheel positioned adjacent to said table and having a pin engageable therewith to advance said spindles with each revolution of said wheel, a lock pin engageable between said table and a fixed portion of said machine, a cam on said wheel engaging said pin and operative to move the same to locked and unlocked positions, a sprocket driven at a constant speed by said second motor, a one revolution clutch including a cam reset lockout pawl and having its relatively movable parts connected to said sprocket and said wheel for drivingly connecting said sprocket with said wheel, a pneumatic piston positioned to engage said pawl and move the same to engage said clutch, a second variable speed reducing mechanism driven from said second motor, a cam shaft driven by said second mechanism and having a plurality of cams thereon, a plurality of pneumatic valves having a source of compressed air and positioned adjacent to said cams and arranged to be opened thereby, and a conduit connecting one of said valves to said pneumatic piston, another of said valves being connected to actuate auxiliary machines associated with said machine.

2. In a turret type machine having a revolvable table with a plurality of spindles mounted on said table for rotation about their individual axes the combination of driving mechanisms comprising, a first motor, a chain looped around the path of movement of said spindles and engaged therewith for rotating said spindles, speed reducing mechanism drivingly connecting the first motor with said chain, said chain being spaced from the path of said spindles at one revolved position thereof on said table to provide a non-rotating operator's position of the spindles, a brake shoe positioned to engage the spindle located at said operator's position, a second motor, a Geneva wheel positioned adjacent to said table and having a pin engageable therewith to advance said spindles with each revolution of said wheel, a lock engageable between said table and a fixed portion of said machine, a cam on said wheel operative to move the same to locked and unlocked positions, a sprocket driven at a constant speed by said second motor, a one revolution clutch having its relatively movable parts connected to said sprocket and said wheel for drivingly connecting said sprocket with said wheel, a pneumatic piston positioned to engage said clutch, a second variable speed reducing mechanism driven from said second motor, a cam shaft driven by said second mechanism and having a plurality of cams thereon, a plurality of pneumatic valves having a source of compressed air and positioned adjacent to said cams and arranged to be opened thereby, and a conduit connecting one of said valves to said pneumatic piston, another of said valves being connected to actuate auxiliary machines associated with said machine.

3. In a turret type machine having a revolvable table with a plurality of spindles mounted on said table for rotation about their individual axes the combination of driving mechanisms comprising, a first motor, a chain looped around the path of movement of said spindles and engaged therewith for rotating said spindles, adjustable speed reducing mechanism drivingly connecting the first motor with said chain, said chain being spaced from the path of said spindles at one revolved position thereof on said table to provide a non-rotating operator's position of the spindle, a brake positioned to engage the spindle located at said operator's position, a second motor, a Geneva wheel positioned adjacent to said table and having a pin engageable therewith to advance said spindles with each revolution of said wheel, a sprocket driven at a constant speed by said second motor, a one revolution clutch having its relatively movable parts connected to said sprocket and said wheel for connecting said sprocket with said wheel, a pneumatic piston positioned to engage said clutch, a second speed reducing mechanism driven from said second motor, a cam shaft driven by said second mechanism and having a cam thereon, a pneumatic valve having a source of compressed air and positioned adjacent to said cam and arranged to be opened thereby, and a conduit connecting said valve to said pneumatic piston.

4. In a turret type machine having a revolvable table with a plurality of spindles mounted on said table for rotation about their individual axes the combination of driving mechanisms comprising, a first motor, a chain looped around the path of movement of said spindles and engaged therewith for rotating said spindles, mechanism connecting the first motor with said chain, said chain being spaced from the path of said spindles at one revolved position thereof on said table to provide a non-rotating operator's position of the spindle, a second motor, a Geneva wheel positioned adjacent to said table and having a pin engageable therewith to advance said spindles with each revolution of said wheel, a one revolution clutch having its relatively movable parts connected to said motor and said wheel for connecting said second motor with said wheel, a pneumatic piston positioned to engage said clutch, a second speed reducing mechanism driven from said second motor, a cam shaft driven by said second mechanism and having a cam thereon, a pneumatic valve having a source of compressed air and positioned adjacent to said cam and arranged to be opened thereby, and a conduit connecting said valve to said pneumatic piston.

5. In a turret type machine having a revolvable table with a plurality of spindles mounted on said table for rotation about their individual axes the combination of driving mechanisms comprising, a first motor, a chain looped around the path of movement of said spindles and engaged therewith for rotating said spindles, mechanism drivingly connecting the first motor with said chain, a Geneva wheel positioned adjacent to said table and having a pin engageable therewith to advance said spindles with each revolution of said wheel, a second motor, a one revolution clutch having its relatively movable parts connected to said motor and said wheel for connecting said second motor with said wheel, pneumatic means for engaging said clutch, speed reducing mechanism driven from said second motor, a cam shaft driven by said speed reducing mechanism and having a cam thereon, a pneumatic valves having a source of compressed air and positioned adjacent to said cam and arranged to be opened thereby, and a conduit connecting said valve to said pneumatic piston to actuate said means.

6. In combination with a turret type machine having a revolvable table with a plurality of spindles mounted thereon for rotation about their individual axes, means including a variable speed transmission connected to rotate said spindles, other means including a Geneva movement connected to said table for angularly advancing said table, driving mechanism connected to said other means to drive said other means and including a one revolution clutch, a second variable speed transmission connected to and driven from the same source as said driving mechanism, a cam shaft driven by said second transmission and having a cam thereon, pneumatic means positioned adjacent to and operative when actuated to engage said clutch, a valve having a source of compressed air and positioned adjacent to said cam shaft to be opened by said cam, and a conduit connecting the outlet of said valve to said pneumatic means whereby said pneumatic means is actuated by said valve.

7. In combination with a turret type machine having a revolvable table with a plurality of spindles mounted thereon for rotation about their individual axes, means mounted in said machine and connected to said spindles for rotating said spindles, other means mounted in said machine including a Geneva movement connected to said table and operative to advance said table, driving mechanism mounted in said machine and connected to said other means to drive said other means and including a one revolution clutch connected in power transmitting series ahead of said Geneva movement, a variable speed transmission mounted in said machine and connected to said driving mechanism and ahead of said one revolution clutch, a cam shaft driven by said transmission and having a cam thereon, pneumatic means positioned adjacent to and operative when actuated to engage said clutch, a valve having a source of compressed air and positioned adjacent to said cam shaft to be opened by said cam, and a conduit connecting the outlet of said valve to said pneumatic means whereby said pneumatic means is actuated by said valve.

8. In combination with a turret type machine having a revolvable table with a plurality of spindles mounted thereon for rotation about their individual axes, means associated with said machine and connetced to said spindles for rotating said spindles, other means connected to said table for angularly advancing said table, driving mechanism connected to said other means to drive said other means and including a power source and a one revolution clutch, a variable speed transmission connected to be driven from the same power source as said driving mechanism, a cam shaft driven by said transmission and having a cam thereon, fluid operated means positioned adjacent to and operative when actuated to engage said clutch, a valve having a source of fluid under pressure and positioned adjacent to said cam shaft to be opened by said cam, and a conduit connecting the outlet of said valve to said fluid operated means.

9. In combination with a turret type machine having a revolvable table with a plurality of spindles mounted thereon for rotation about their individual axes, means associated with said machine and connected to said spindles for rotating said spindles, other means connected to said table for angularly advancing said table, driving mechanism connected to said other means to drive said other means and including a power source and a clutch, a variable speed transmission driven from the same source as said driving mechanism, a cam shaft driven by said transmission and having a cam thereon, fluid operated means positioned adjacent to and operative when actuated to engage said clutch, a valve having a source of fluid under pressure and positioned adjacent to said cam shaft to be opened by said cam, and a conduit connecting the outlet of said valve to said fluid operated means.

10. In combination with a turret type machine having a revolvable table with a plurality of spindles mounted thereon for rotation about their individual axes, means associated with said machine and connected to said spindles for rotating said spindles, other means connected to said table for angularly advancing said table, driving mechanism connected to said other means to drive said other means and including a clutch, a variable speed transmission, a cam shaft driven by said transmission and having a cam thereon, fluid operated means positioned adjacent to and operative when actuated to engage said clutch, a valve having a source of fluid under pressure and positioned adjacent to said cam shaft to be opened by said cam, and a conduit connecting the outlet of said valve to said fluid operated means.

11. In a turret type machine having a revolvable table with a plurality of spindles mounted thereon for rotation about their individual axes the combination comprising, a first means mounted in said machine and connected to rotate said spindles, a second means including a Geneva movement in said machine and connected to advance said table, a third means in said machine connected to drive said second means and including a one revolution clutch, a transmission having an output shaft in said machine, said transmission being infinitely and manually adjustably variable in ratio between limits, a fourth means connected to drive said transmission from the same power source as said third means, a clutch engaging member positioned to engage said clutch, and means including a fluid pressure system having an actuating element associated with said shaft to be actuated thereby and engageable with said clutch engaging member to move said member to clutch engaging position, said first and third means being driven independently of the output shaft of said transmission.

12. In a turret type machine having a revolvable table with a plurality of spindles mounted thereon for rotation about their individual axes the combination comprising, a first means mounted in said machine and connected to rotate said spindles, a second means in said machine and connected to advance said table, a third means in said machine connected to drive said second means and including a clutch, a transmission having an output shaft in said machine, said transmission being manually adjustably variable in ratio between limits, a fourth means connected to drive said transmission, a clutch engaging member positioned to engage said clutch, and means having an actuating element associated with said shaft to be actuated thereby and engageable with said clutch engaging member to move said member to clutch engaging position, said first and third means being driven independently of the output shaft of said transmission.

CLARENCE A. ZINN.
HENRY G. PERKINS.

References Cited in the file of this patent

UNITED STATES PATENTS

| Number | Name | Date |
| --- | --- | --- |
| 503,475 | Fowler | Aug. 15, 1893 |
| 808,887 | Trueman | Jan. 2, 1906 |
| 1,140,299 | Conradson | May 18, 1915 |
| 1,360,175 | Bullard | Nov. 23, 1920 |
| 1,449,464 | Van Hamersfeld | Mar. 27, 1923 |
| 1,547,504 | Le Boeuf | July 28, 1925 |
| 1,586,066 | Bullard | May 25, 1926 |
| 1,750,433 | Rosche | Mar. 11, 1930 |
| 1,805,054 | Spring | May 12, 1931 |
| 2,359,939 | Reynolds | Oct. 10, 1944 |
| 2,377,992 | Carlson | June 12, 1945 |